UNITED STATES PATENT OFFICE.

LUCIEN JUMAU, OF PARIS, FRANCE.

PROCESS OF OBTAINING PURE COPPER.

No. 870,786.　　　Specification of Letters Patent.　　　Patented Nov. 12, 1907.

Application filed July 19, 1906. Serial No. 326,844.

*To all whom it may concern:*

Be it known that I, LUCIEN JUMAU, a citizen of France, residing at Paris, in the said Republic, have invented new and useful Improvements in Process for Obtaining Pure Copper, of which the following is a specification.

My invention relates to an improved process for obtaining pure metallic copper from a solution of a salt of copper, and it consists in the steps and processes herein described and claimed.

In the usual wet method of extracting copper from its ores, the ore, with or without previous roasting, is leached with a suitable solution for dissolving the copper; the copper being usually extracted in the form of a sulfate. The copper solution thus obtained contains many impurities, which render it difficult to obtain the copper in a pure form therefrom. A well known process consists in precipitating the copper from the solution by treating the latter with scrap iron; the copper being precipitated as "cement copper", which contains impurities necessitating subsequent treatment by a dry method for refining the copper.

The object of my invention is to eliminate the treatment with iron which is long and costly and to precipitate the copper in a pure state from its solution.

By my improved process, the salt of copper is heated under pressure in the presence of a suitable sulfite, such as, for example, sulfite of ammonia, or sulfite of hydrogen, commercially known as sulfurous acid. In this process, the copper is precipitated from the solution in the form of pure metallic copper, and the sulfite is oxidized to a sulfate. Thus, a sulfite of ammonia would be oxidized to sulfate of ammonia, and sulfite of hydrogen would be oxidized to sulfate of hydrogen, commercially known as sulfuric acid.

As a practical example of the carrying out of my process, a solution of sulfate of copper obtained by leaching ores in the usual manner is subjected to the action of heat and pressure in the presence of a suitable proportion of sulfite of hydrogen; the process being conveniently performed in a digester lined with lead. The action is found to be very rapid, and it is found that the proportion of copper precipitated in a pure metallic form is increased by raising the temperature, the increase varying approximately as the temperature; a temperature of 170° C. has proven very satisfactory in practice.

In order to operate at a relatively high temperature without engendering an excessive pressure, it has proven desirable to employ only the necessary theoretically determined proportion of sulfite of hydrogen, and to gradually increase the heat to the desired temperature. When sulfite of hydrogen is employed as the reducing agent, the final operation, omitting certain intermediate reactions, may be stated as follows:

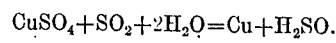

$$CuSO_4 + SO_2 + 2H_2O = Cu + H_2SO.$$

The copper obtained by this process is absolutely pure and free from sulfite or oxid of copper.

If the solution of the salt of copper contains precious metals, they can be separated by a preliminary treatment of such solution with sulfite of hydrogen under the action of heat and at ordinary pressure. This preliminary treatment precipitates the precious metals without affecting the copper in the solution. If a sufficient quantity of sulfite of hydrogen remains in the solution after removal of the precipitated precious metals, the copper can then be precipitated in a pure metallic form by increasing the pressure. However, my preferred method is to add to the solution after the removal of the precipitated precious metals, a sufficient amount of sulfite of hydrogen to precipitate the copper. The copper precipitate may be fused, or compressed into briquets by hydraulic pressure, and such briquets may then be employed as anodes if it is desired to further refine the copper by electrolytic process.

From the above description, it will be understood that my improved process is especially advantageous in the treatment of sulfid ores; the sulfite of hydrogen employed being obtained during the roasting of such ores, and the sulfuric acid resulting from the final treatment being employed for leaching a fresh supply of ores.

I have illustrated a preferred and satisfactory process, but, obviously, changes could be made within the spirit and scope of my invention.

Having thus described my invention, what I claim as new therein and desire to secure by Letters Patent is:—

1. The herein described process for obtaining pure copper, which consists in precipitating the precious metals from a solution of a salt of copper by treating said solution with a sulfite at a raised temperature under substantially atmospheric pressure, separating the solution from the precious metals thus precipitated, and subjecting said separated solution to heat and pressure in the presence of a sulfite.

2. The herein described process for obtaining pure copper, which consists in precipitating the precious metals from a solution of a salt of copper by treating said solution with a sulfite at a raised temperature under substantially atmospheric pressure, separating the solution from the precious metals thus precipitated, treating said separated solution with a sulfite, and subjecting said solution and sulfite to heat and pressure for precipitating metallic copper.

3. The herein described process for obtaining pure copper, which consists in precipitating the precious metals from a solution of a salt of copper by treating said solution with a sulfite at a raised temperature under substantially atmospheric pressure, separating the solution from the precious metals thus precipitated, treating said separated solution with a sulfite, subjecting said solution and sulfite to heat and pressure for precipitating metallic copper, and transforming the copper thus precipitated into pure massive copper.

4. The herein described process for obtaining pure copper, which consists in precipitating the precious metals from a solution of a salt of copper by treating said solution with sulfite of hydrogen at a raised temperature under substantially atmospheric pressure, separating the solution from the precious metals thus precipitated, treating said separated solution with sulfite of hydrogen, and subjecting said solution and sulfite of hydrogen to heat and pressure for precipitating metallic copper.

5. The herein described process for obtaining pure copper, which consists in precipitating the precious metals from a solution of a salt of copper by treating said solution with a sulfite at a temperature of approximately 170° C. under substantially atmospheric pressure, separating the solution from the precious metals thus precipitated, treating said separated solution with a sulfite, subjecting said solution and sulfite to heat and pressure for precipitating metallic copper, and transforming the copper thus precipitated into pure massive copper.

In testimony whereof I have signed my name to this specification in the presence of two subscribing witnesses.

LUCIEN JUMAU.

Witnesses:
JULES FAYOLLET,
EUGÈNE PICHON.